Nov. 20, 1956

D. KLEIST ET AL 2,771,387

BITUMINOUS TREATED GLASS FIBER STRUCTURES
AND METHODS OF PRODUCING THEM

Filed Nov. 21, 1951

INVENTORS:
Dale Kleist,
William R. Sidwell
and Ralph J. Reed,
BY Stebbins & Overman
ATTORNEYS.

Nov. 20, 1956  D. KLEIST ET AL  2,771,387
BITUMINOUS TREATED GLASS FIBER STRUCTURES
AND METHODS OF PRODUCING THEM
Filed Nov. 21, 1951  2 Sheets-Sheet 2
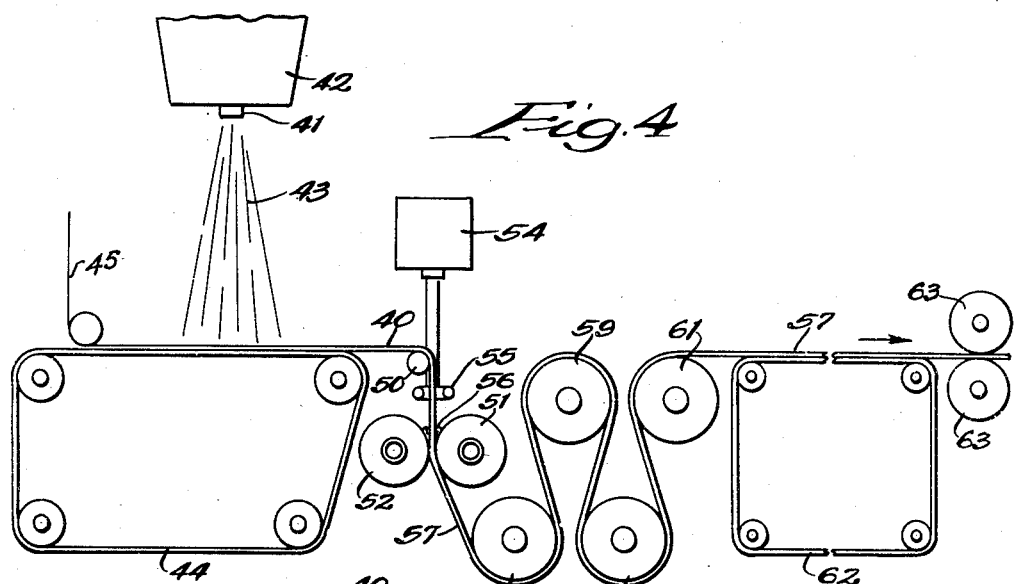
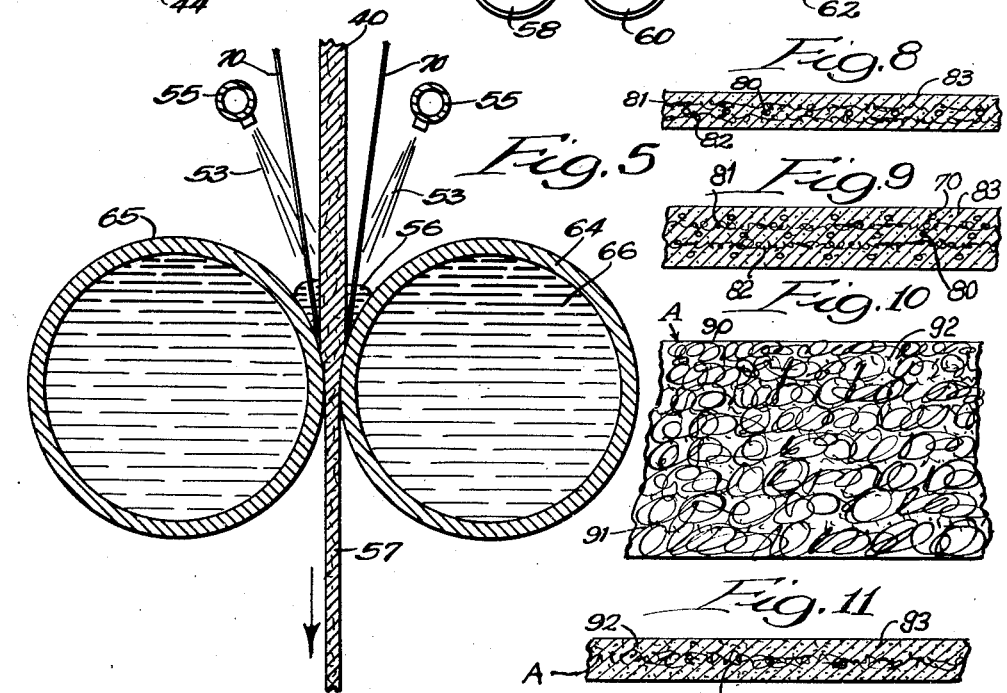
INVENTORS:
Dale Kleist,
William K. Sidwell
and Ralph J. Reed,
BY
ATTORNEYS.

United States Patent Office 2,771,387
Patented Nov. 20, 1956

2,771,387

BITUMINOUS TREATED GLASS FIBER STRUCTURES AND METHODS OF PRODUCING THEM

Dale Kleist, William K. Sidwell, and Ralph J. Reed, Newark, Ohio, assignors to Owens-Corning Fiberglas Corporation, Toledo, Ohio, a corporation of Delaware Application November 21, 1951, Serial No. 257,602

13 Claims. (Cl. 154—93)

This invention relates to bituminous treated glass fiber structures and to methods for producing same. It relates more particularly to the manufacture of structures of glass fibers treated with a bituminous material for use in the fabrication of roofing, pipe shields or pipe wrap, roof felt, cap sheets, flashings, liners for irrigation systems and the like. It relates also to the manufacture of bituminous impregnated and coated glass fiber fabrics selectively reinforced to resist breakage during application and use, as will hereinafter be pointed out in greater detail, and which are formed with points of anchorage to effect better integration or bond with underlying surfaces, as will hereinafter appear.

It is an object of this invention to produce and to provide a method for producing structures of the type described. It is a related object to produce structures of the type described by continuous operation and to provide new and improved apparatus for accomplishing same.

These and other objects and advantages of this invention will hereinafter appear, and for purposes of illustration, but not of limitation, embodiments for the practice of this invention are shown in the accompanying drawings, in which—

Figure 4 is a diagrammatic view of a modification in apparatus for the manufacture of bituminous impregnated glass fiber products;

Figure 5 is an enlarged sectional view showing the arrangement at the point of bituminous impregnation in the system shown in Figure 4;

Figure 6 is a top plan view of a bituminous impregnated glass fiber mat produced by the system illustrated in Figures 4 and 5;

Figure 7 is a further modification in a reinforced bituminous treated mat produced by the system of either Figure 4 and 5 but without incorporation of parallel reinforcing strands;

Figure 8 is a sectional elevational view showing a further modification of a glass fiber reinforced bituminous structure embodying features of this invention;

Figure 9 is a sectional elevational view showing a still further modification of glass and bitumen structure capable of being produced by this invention;

Figure 10 is a top plan view of a new type of glass fiber structure which may be used with bituminous material in the practice of this invention, and Figure 11 is a sectional elevational view of a product secured by the treatment of the mat shown in Figure 9 with bituminous material in accordance with the practice of this invention.

Description herein of the inventive concepts will be made first of the technique and apparatus for the desired bituminous treatment of glass fiber fabrics followed by description of specific modifications embodying new and improved features for better adapting the bituminous treated and bituminous impregnated glass fiber fabrics for the purpose for which they were intended and methods for manufacturing same. This invention is concerned chiefly with the apparatus and method for application of bituminous materials as a hot melt for treatment or impregnation of porous glass fiber fabrics.

Figure 1:
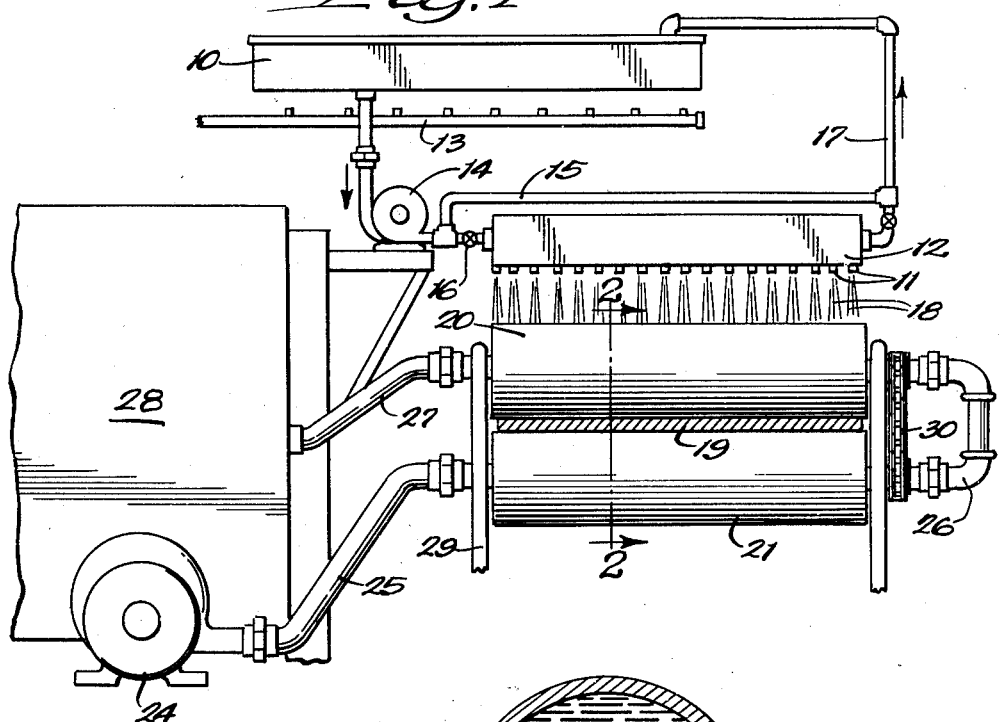
Figure 1 is a diagrammatic view of apparatus suitable for the manufacture of structures embodying features of this invention.

In the use of bituminous material as a hot melt in the treatment of glass fiber fabrics, it has been found to be desirable to maintain a continuous and steady flow of the bituminous material, otherwise non-uniform deposition is achieved. Non-uniform deposition is believed to result from the build up of incrustation of the bituminous material on the inner walls of the conduit and from plugged pipes or valves caused by solidification of the bituminous material upon cooling, as when flow is temporarily stopped. In order to overcome such non-uniform deposition and obviate the causes thereof, means have been developed for constant movement or circulation of the molten bituminous material, as shown in Figure 1.

Bituminous material contained in reservoir 10 is heated by burners 13 to molten condition for circulation to feed bushings 11 of header 12. That which flows through the bushings for use in fabrication of bituminous treated structures is replaced into the reservoir from an outside source. In operation, pump 14 withdraws molten bituminous material from the reservoir or tank 10 in excess of that which can be accepted by header 12 so that at least a portion of the molten bituminous material withdrawn will constantly by-pass the header and flow through passage 15. That which does not issue from bushing 11 and that which is by-passed through passage 15 are brought together in passage 17 for return to the reservoir.

By this system, constant flow of molten material is maintained in all parts with the result that temperature drop below freezing for the bituminous composition fails to occur in any part during normal operation. In the event that it is desired to stop the flow of molten bituminous material 18 from bushing 11, valve 16 may be shut off so as to cut off flow into the header 12. Molten bituminous material, however, continues through the tubing system by recirculation through passage 15, while the molten material remaining in the header 12 drains out through bushing 11.

The portion of the molten bituminous material 18 which issues from bushing 11 falls by gravity onto the upper wall of a porous glass fiber fabric 19 passing therebeneath. Some impregnation of the porous fabric 19 will take place almost immediately. Sufficient impregnation is difficult to achieve by gravitational flow and reliance is had on cooperating squeeze rollers 20 and 21 to force the molten bituminous material into the fabric. When complete impregnation is desired or when it is desired substantially completely to fill the interstices of the fabric, the amount of molten bitumen deposited should be sufficient to maintain pools, or puddles 22 of molten bituminous material where the fabric enters between the rollers. Where use permits, it is economically advisable completely to fill the fabric and make maximum use of the lower cost bituminous material.

A new and novel practice is embodied in the system wherein rollers 20 and 21 are cooled, preferably to temperature below freezing, to harden or solidify the bituminous material as it passes with the glass fiber fabric between the rollers. For this purpose, the rollers are either channeled or formed of hollow cylindrical members to enable circulation of the coolant 23 therethrough. Water may be circulated if it can be supplied sufficiently refrigerated to give the desired effect, such for example as at temperatures of about 32° F. In the alternative, coolants such as Freon (dichloro difluoro methane), brine and the like may be used circulated by pump 24 through conduit 25 and into the lower roller 21. It passes from the lower roller 21 to the upper roller 20 through end coupling 26 and then it returns through conduit 27 to reservoir or refrigerator 28. The rollers, which are supported on base 29, are adapted to be driven through chain 30.

Glass fibers in the form of porous bonded mat, porous unbonded mat and combinations thereof may be used in the practice of this invention. With unbonded mat, it is best to effect application or treatment with the bituminous composition as a continuous and successive operation in conjunction with mat formation. In such structures, the bituminous material functions in addition as a bonding agent which secures the fibers one to another in the composite structure. With bonded mat, bituminous treatment may be carried out in combination with the formation of the mat or independently thereof.

To illustrate the practice of this invention with various types of glass fiber mats to produce new and improved glass fiber-bituminous structures, reference will now be made to Figures 4, 5 and 6 for the treatment of a porous unbonded mat 40 of glass fibers. In the manufacture of unbonded, porous mats of glass fibers, a plurality of streams of molten glass issuing from a bushing 41 located on the underside of a glass melting pot or furnace 42 are rapidly attenuated into fine fibers of discontinuous lengths by high pressure steam or air by directing downwardly onto the streams at an angle.

The fibers 43 fall by gravity through a forming hood (not shown) and collect in haphazard interfelted arrangement on a foraminous collecting belt 44. The belt moves constantly in one direction to form a continuous web 40 of interfelted glass fibers. By varying the linear speed of the belt or by varying the concentration of glass fibers rained down from above, the thickness of the web may be varied from a very thin veil to a relatively thick porous bat.

The porous web 40 of unbonded glass fibers is led downwardly over roller 50 to between a pair of horizontally disposed cooperating compression or squeeze rollers 51 and 52. Molten bituminous material 53, fed from melting tank 54 to headers 55 disposed on each side of the web, is sprayed onto the side walls of the web and into the crotch formed by the rollers. The rollers 51 and 52, which may be heated to maintain the bituminous material in molten condition, compress the fibrous web and force the bituminous material into the interstices or voids of the fabric. The amount of bituminous material supplied should be sufficient to form pools or puddles 56 at the entrant side especially if it is desired completely to fill the interstices of the fabric.

When rollers 51 and 52 are heated, the impregnated web 57 is advanced over cooled or refrigerated rolls 58, 59, 60 and 61 or any combination thereof to set the bitumen. Thereafter, the impregnated web is conducted by a moving belt 62 or other suitable conveyor cutting roll 63 or to a packaging section where the web is cut to desired dimension. When, instead of employing heated rolls 51 and 52 for forcing the bitumen into the pores of the fabric, refrigerated rolls 64 and 65 are employed, impregnation and setting of the bitumen may be accomplished without the aid or subsequent use of rollers 58, 59, 60 or 61. Rollers 64 and 65 are hollow cylindrical members through which coolant 66 may be circulated.

A product of the type produced by the method described to the present is illustrated in Figure 7.

In bonded mats or bats, the fibers are secured one to another at their intersections by an adhesive applied prior to or after the fibrous layer forms on the collecting belt, as described in the Bergen et al. Patent No. 2,252,157. Depending on the amount of adhesive and the compression of the layer while the adhesive is being cured, the density of the bonded bat may range from a fluffy mass of one-half pound per cubic foot to a dense board of 15 or 20 pounds per cubic foot formed of mat generally having a thickness ranging from 15–50 mils or more. When the bituminous material is applied as a hot melt, best practice calls for the use of a thermoset binder for securing the fibers in the fabric. In the manufacture of bituminous impregnated glass fiber products, it is desirable to keep the resin adhesive concentration at a minimum and the concentration of the low cost bituminous material at a maximum. Where porosity or voids are not necessary, any means insuring complete impregnation and even overcoating with bituminous material is desirable.

Figure 2:
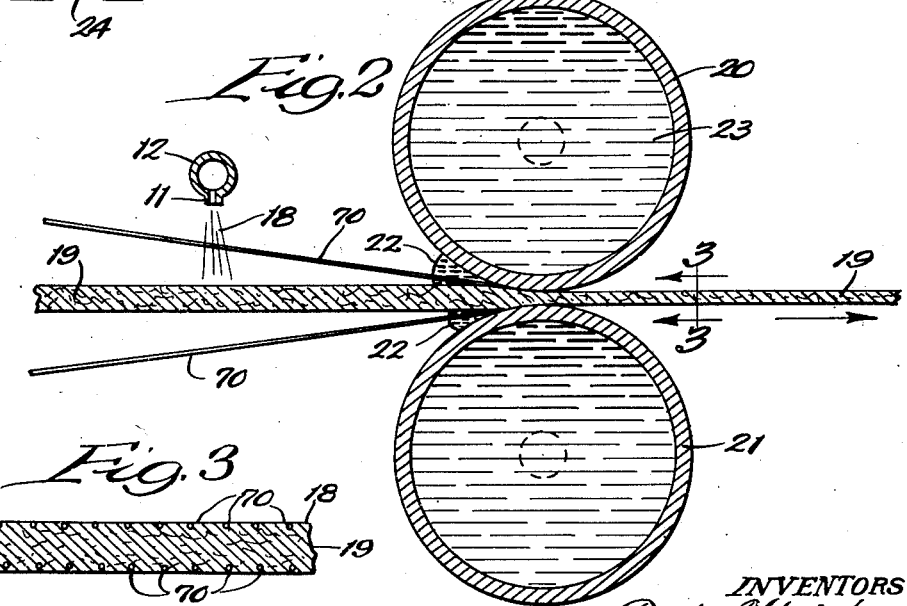
Figure 2 is an enlarged sectional view taken along the line 2—2 of Figure 1 with the glass fiber fabric magnified in thickness for illustration.

As shown in Figures 1 and 2, a web 19 of bonded glass fibers may be advanced horizontally to between a pair of vertically spaced adjustable rollers 20 and 21 having refrigerant 23 circulating therethrough. The bituminous material in the form of a hot melt may be sprayed onto the surface of the mat in advance of the rolls in amounts sufficient to form pools 22 at the nip in the event that substantially complete impregnation is desired. If it is desirable to maintain pin holes or other openings in the mat for purposes which will hereinafter be described, less than that sufficient completely to fill the interstices may be applied and the web may be caused to pass over a suction box to remove excess bituminous material and control the amount thereof in the final structure. The rollers 20 and 21 force the bitumen into the mat and even cause some compression of the mat to smaller dimension whereby a product of relatively high density is secured. The bituminous material is adapted to become set sufficiently before it passes beyond the cooled compression rollers thereby to cause the glass fiber-bituminous structure substantially to retain the dimension to which it is formed.

An important concept of this invention resides in the manufacture of new and improved fibrous structures formed of bonded or unbonded glass fibers arranged in fabric form and combined with bituminous material. It has been found that in the use of bituminous impregnated glass fiber reinforced or filled structures of the type described, satisfactory bonding to underlying surfaces or coatings is difficult to achieve when the fabric has a relatively smooth continuous layer of bitumen on the surface. Maximum concentration of bituminous material and satisfactory integration or bonding to adjacent surfaces, which may be an undercoat of bitumen in roofing or in wrapping pipe or the like, can be achieved, however, when openings extending through the impregnated fabric are provided for permitting entrance of material for establishing a bonding relation. A fabric of the type described is not to be confused with a porous fabric having a large percentage of voids but constitutes a substantially completely filled or impregnated fabric with small openings therethrough. Such openings may be allowed to be formed in fabrication or by the use of some fibers treated to resist wetting out by the bitumen or the small openings may intentionally be formed by a piercing tool or the like, or they may be secured as described by the application of insufficient bituminous material completely to fill the voids or removal of excess by vacuum means.

Because of the inertness of glass fibers, their resistance to attack by fungus, weather conditions, chemicals or heat, glass fibers constitute an ideal material for use in wrapping underground pipe or the like. In building up a protective insulation for underground pipe, the outer wall of the pipe is first coated with a layer of molten bitumen; one or more layers of glass fiber mat are wound about the bitumen coated pipe and then one or more top coats of molten bitumen are applied onto the glass fiber fabric. It is important to have the bituminous top coat flow through the interstices of the fabric in order to eliminate deterioration by the presence of voids and it is important for the bitumen of the top coat or bottom coat to flow readily through the fabric for purpose of integrating the coats into a well bonded composite structure.

Another problem which has existed in the use of bituminous coated or impregnated glass fiber structures has been the inability of the structure to resist the forces incident to its application or use with the result that failure because of rupture often occurs. For example, in wrapping pipe, the high tension forces incident to the proper application of the fibrous structure in the field has led to breakage as often as thirty times per mile of pipe.

In accordance with the practice of this invention, a new and improved bituminous impregnated or coated glass fiber structure having the characteristic of high strength in any predetermined direction or relatively high strength in all directions parallel to the face of the fabric may be produced. This characteristic of directional strength is achieved primarily by the use of continuous strands or filaments of glass fibers incorporated into the structure incident to its impregnation or treatment with bituminous material or in advance thereof.

Figure 3:
Figure 3 is a still further enlarged sectional view of the final product taken along line 3—3 of Figure 2.

Strength in the longitudinal direction may be achieved by parallel strands 45 of glass fibers introduced in conjunction with the formation of the fibrous web, as illustrated in Figure 4, or by the introduction of parallel strands 70 of glass fibers in conjunction with the application of the bituminous hot melt, as shown in Figures 2 and 5, to form structures, illustrated in section in Figures 3 and 6.

As shown in Figure 2, strands 70 which may be formed of staple fibers but preferably are formed of continuous glass fibers, are fed at a rate corresponding to the travel of the mat 19 and in parallel spaced relation into the pool 22 of bituminous hot melt formed on either side of the mat at the nip between the compression rolls 20 and 21. The spacing between strands may be varied over a fairly wide range depending upon the amount of reinforcement desired and the amount of support which is believed necessary to maintain relatively thick bituminous coatings on the outer surfaces of the composite structure. Ordinarily a spacing ranging from ⅛ to 2 inches between strands offers a very desirable product and such strands may be incorporated into the bituminous coating on one side or on both sides of the fabric, as illustrated in the drawing. The bituminous material becomes set and the strands secured in place as the composite mass passes between the cooled compression rollers 20 and 21. When a fairly thick layer of bitumen is formed on the outer walls of the fabric, the strands become substantially completely embedded therein and are substantially completely concealed therein.

In Figure 5, the reinforcing strands 70 of glass fibers are introduced in a similar manner into pools 56 of molten bituminous material substantially to coat the strands throughout their lengths prior to incorporation in forming a part of the composite structure. Instead of passing the strands through the pools of molten bituminous material to coat the fibers for purposes of achieving better integration, the strands may be incorporated in advance by passing the strands through the spray 53 which permits positioning the strands adjacent the faces of the fabric prior to application of bituminous hot melt thereon. By this technique, the strands can be positioned adjacent the faces of the fabric more completely to integrate its properties with the fibrous structure. Although it is preferred to coat the strands with bitumen, the glass fiber strands may be disposed adjacent the face or faces of the fabric in advance of application of treatment with bitumen, such as is illustrated by strands 45 deposited on the collecting belt in advance of the deposition of continuous fibers thereon in fabric formation.

A new and improved bituminous glass fiber structure may be produced having strands of glass fibers incorporated therein to impart greater strength in the longitudinal or lengthwise direction when the bituminous material is incorporated in the manner described by this invention into a porous, fibrous structure having the spaced parallel strands 80 of glass fibers sandwiched between webs 81 and 82 of haphazardly arranged staple fibers, as described in the copending application of Hogendobler and Simison, Ser. No. 88,672, filed April 20, 1949, now Patent No. 2,731,066. Briefly described, the porous fibrous fabric is prepared by dividing the forming hood through which the discontinuous fibers are rained down from above onto the collecting belt and simultaneously feeding strands 80 of glass fibers in spaced apart parallel relation down through the divided section so that the strands 80 deposit on a first layer 82 of felted fibers and are then covered by a second layer 81 of haphazardly arranged felted fibers rained down from above through the divided forming hood. In the alternative, endless strands of glass fibers may be advanced between separated webs of glass fibers which have been treated with bituminous material in amounts to form pools in advance of the squeeze rolls to form a consolidated structure in which the endless strands of glass fibers are arranged lengthwise between the fabrics impregnated with the bituminous material.

Bitumen 83 in the form of a hot melt may then be applied in the manner described substantially completely to fill the voids of the fabric, as illustrated in Figure 8 or, in the alternative, in an amount insufficient to fill the voids so as to leave openings therethrough for better integration of the fabric with underlying and overlying coats of bituminous material or the like.

As illustrated in Figures 2 and 5, parallel strands 70 or 71 of glass fibers may be introduced adjacent one or both of the outer faces of the sandwich fabric further to increase the lengthwise strength thereof and to support greater concentrations of bitumen in the final structure. A product of the latter type is illustrated in section in Figure 9 of the drawings.

Where high strengths are desired in all directions parallel to the face of the fabric, the glass fiber fabric may be prepared in the form of a swirl mat A wherein strands 90 or glass fibers are fed from a number of closely spaced outlets or through a number of closely spaced eyelets at a rate considerably greater than that of the moving belt upon which the strands drop so that the strands form into swirls 91 on the collecting surface. The swirls overlap one another to form an open, highly porous fibrous structure. Although mat of the type described, referred to as "swirl mat" may be used as such, with or without a bonding agent, a greatly improved mat for use in combination with bitumen is formed by the deposition of staple or discontinuous fibers 92 simultaneously with the strands to form a combination thereof in the fibrous structure. A mat of the type described is schematically illustrated in Figure 10 and the product thereof resulting from bituminous treatment in the manner described is shown in Figure 11.

It will be understood that continuous strands of glass fibers fed at the same rate as the travel of the collecting belt will supply continuous strands in spaced parallel relation in the fabric or such strands may be incorporated adjacent one or both faces of the fabric in the manner shown in Figures 2, 4 and 5 of the drawings.

Bituminous materials suitable for impregnation of porous glass fiber fabrics of the type described may be selected of hydrocarbons having a melting point above room temperature and which are sufficiently fluid when heated to temperatures of about 150–400° F., preferred in the practice of this invention for impregnation of the fibrous structure, or can be made so by compounding with more fluid substances and plasticizers such as oils, solvents and the like. Representative of the bituminous materials which may be used are the natural asphalts, wood pitch, coal tar pitch, tars, waxes, petroleum and natural resins and the like.

It is desirable sometimes to load the material with inorganic finely divided or powdered fillers such as glass sandings, clays, slate flour, chalk, mica dust, crushed or powdered silica, diatomaceous earth and the like to reduce flow and tackiness of the bituminous impregnating composition and to improve its insulating properties. When fillers are used in the impregnating bituminous composition it is necessary to limit the amount of filler to less than 35 percent by weight of the treating composition and it is preferred to keep the filler content within the range of 15-30 percent by weight of the impregnating compound. When the bituminous composition is tacky at room temperature or at the temperature at which it leaves the refrigerated rolls, mica dust, mica flakes or finely divided fillers of the type described may be sprinkled onto the surface of the rolls to minimize adhesion.

Structures of the type described usually have as much or more of the bituminous compound than glass fiber and most often the ratio of bitumen exceeds 60 percent by weight in the final product and may be as high as 98 percent by weight bitumen to 2 percent by weight glass fiber.

The following is a specific example for manufacturing roofing having a weight of 28 pounds per 100 square feet, 5 of which is glass fiber to 23 pounds bitumen. Glass mat one foot wide and weighing two ounces per square foot is advanced at the rate of about 12 feet per minute to between a pair of squeeze rolls 20 and 21 each of which is about eight inches in diameter and cooled by recirculating brine to a temperature in the range of 28-32° F. Coal tar pitch having a softening point of about 185° F. is sprayed onto the surface of the mat at a temperature of 330° F. and at a rate of about 1.95 pounds per minute. The amount of coal tar pitch is sufficient to load the mat and the speed of travel is calculated to cool the coal tar pitch to about 80° F. before it leaves the refrigerated squeeze rolls so that the material is set and can be handled without any precautions and without sticking to the roll.

Instead of using coal tar pitch, low melting point asphalt loaded with about 15 percent by weight diatomaceous earth may be sprayed as a hot melt onto the sides of the glass fiber web as it passes downwardly between the refrigerated squeeze rolls 64 and 65. Glass fiber strands, spaced on ⅜ inch centers may be drawn through the puddles to become completely integrated with the impregnated fabric as it passes between the squeeze rolls. When such strands or fabrics of continuous glass fibers are used to reinforce the fabric and support greater amounts of bitumen on the surface, it is best to replace the normal size on the glass fiber surfaces with paraffin or other waxy substance more compatible with the bitumen.

It will be apparent that this invention provides for the impregnation of glass fiber fabrics with bituminous material in molten form in a novel and expedient manner. The apparatus described militates against inadvertent interruptions of the operation or disconformities in the amount of bituminous hot melt flowed upon the fabric to be impregnated because of the provisions for constant circulation of the hot melt through the carrier system and complete drainage of the header from which the melt flows upon the fabric. Incidentally, the combination of cooling and impregnation in the same operation permits a greater amount of bitumen to be embodied in the fabric and, therefore, favorably influences the bitumen to glass ratio.

Invention herein also resides in the manufacture of new and improved glass fiber-bitumen products wherein the ratio of bitumen to glass fibers is increased, especially at the surface, and greater strengths are introduced by the presence of continuous strands of fibers fully integrated with the fabric and embedded therein.

It will be understood that numerous changes may be made in materials and in the arrangement of processing steps and materials without departing from the spirit of this invention, especially as defined in the following claims.

We claim:

1. A composition of matter comprising a porous fabric of glass wool fibers, a bituminous compound impregnating the fabric and coating the surfaces thereof, and a plurality of glass fiber strands in closely spaced apart relation embedded within the coating of the bituminous compound.

2. A composition of matter comprising a porous fabric of bonded glass wool fibers, a bituminous composition impregnating the fabric substantially completely to fill the voids and coating the surfaces thereof, and continuous glass fibers coated with a hydrocarbon compatible with the bituminous composition and embedded within the coating of the bituminous composition in closely spaced apart parallel relation.

3. A composition of matter comprising a porous fabric of bonded glass wool fibers, a bituminous composition comprising 100-30 parts by weight bitumen and 0-70 parts by weight inorganic filler impregnating the fabric and forming a relatively heavy coating on the fabric, and continuous glass fiber strands embedded within the coating of bituminous composition in closely spaced apart parallel relation, the ratio of glass to bituminous composition being within the range of 50-80 percent by weight bituminous composition to 50-20 percent by weight glass.

4. The method of manufacturing a glass fiber fabric impregnated with bituminous material comprising the steps of heating a bituminous composition ordinarily solid at room temperature to fluid condition, applying the hot melt of bituminous material to a porous fabric of glass wool fibers in sufficient quantity to fill the pores of the fabric and provide a generous coating, passing the fabric with the bitumen through squeeze rolls while the bituminous composition is still in flowable form whereby puddles of bituminous material are formed at the nip, feeding a plurality of strands of continuous fibers in closely spaced apart parallel relation through the puddles and then between the squeeze rollers whereby they are fully wetted by the bituminous composition and embedded within the coating of the fabric, and then passing the impregnated mass about cooling rolls to set the bituminous material.

5. The method of manufacturing a glass fiber fabric impregnated with bituminous material comprising the steps of heating the bituminous composition to a molten state at a temperature within the range of 250-400° F., applying the hot melt of bituminous material to a porous fabric of glass wool fibers in sufficient quantity to fill the pores of the fabric and provide a generous coating, passing the fabric with the bitumen through squeeze rolls maintained at a temperature below 32° F. whereby puddles of bituminous material are formed at the nip, and feeding a plurality of strands of continuous fibers in closely spaced apart parallel relation through the puddles and then between the squeeze rollers whereby they are fully wetted by the bituminous composition and embedded within the coating on the fabric.

6. The method as claimed in claim 5 wherein an inorganic powder is dusted on the peripheral surface of the squeeze rolls to minimize adhesion between the bituminous material and the surface of the rolls.

7. The method of manufacturing a glass fiber fabric impregnated with bituminous material comprising the steps of feeding continuous strands of glass fibers in closely spaced apart parallel relation with discontinuous glass fibers deposited to form a mat in which the strands extend lengthwise therethrough, applying the bituminous material as a hot melt to the formed fabric of glass fibers in sufficient quantity substantially completely to fill the pores, passing the fabric with the bitumen between squeeze rolls while the bitumen remains in flowable condition whereby pools of excess bitumen form in the crotch, and then setting the bituminous material impregnating and coating the fabric.

8. The method as claimed in claim 7 in which the impregnation of the fabric leaves occasional openings therethrough for anchorage points in subsequent treatment.

9. The method as claimed in claim 7 in which the continuous bundles are fed into separate portions of the fiber depositing zones to distribute the bundles through the thickness of the mat.

10. The method as claimed in claim 4 in which separate fabrics are fed through the pools of bituminous material into the squeeze rolls and the strands of glass fibers are fed therebetween to be arranged lengthwise between the fabrics.

11. The method of manufacturing a bitumen-glass fiber structure of high unidirectional strength comprising the steps of depositing a first layer of staple glass fibers in interfelted relation to form a porous web, depositing longitudinally disposed strands of continuous glass fibers in closely spaced apart parallel relation onto the first layer of interfelted fibers, depositing a second layer of staple glass fibers in interfelted relation onto the first layer to sandwich the parallel strands therebetween and form a highly porous fibrous web having high strength in the longitudinal direction, applying a bituminous composition as a hot melt onto the surface of the web in an amount in excess substantially to fill the voids, and passing the web with the molten bituminous material through refrigerated squeeze rolls to force the bituminous material into the pores of the web while cooling the bituminous material to non-flowable condition.

12. The method of manufacturing a bitumen-glass fiber structure of high unidirectional strength comprising the steps of depositing a first layer of staple glass fibers in interfelted relation to form a porous web, depositing longitudinally disposed strands of continuous glass fibers in closely spaced apart parallel relation onto the first layer of interfelted fibers, depositing a second layer of staple glass fibers in interfelted relation onto the first layer to sandwich the parallel strands therebetween and form a highly porous fibrous web having high strength in the longitudinal direction, applying a hot melt of bituminous material to the web of glass fibers in amounts in excess substantially to fill the pores thereof and provide a coating thereon, advancing the web with the bitumen through squeeze rolls while the bituminous composition is still in flowable condition whereby the bituminous material is forced into the interstices of the web and form as puddles at the nip of the rolls, feeding a plurality of strands of continuous glass fibers in closely spaced apart parallel relation onto the area adjacent the surfaces of the web in advance of the squeeze rolls whereby they become fully wetted by the bituminous material and embedded to support the bituminous coating formed upon the outer walls of the web, and then setting the bituminous material by advancing the composite mass in surface contact with cooling rolls.

13. The method of producing a bitumen-glass fiber structure of high strength in all planar directions comprising the steps of feeding a plurality of endless strands of glass fibers from a number of closely spaced apart sources onto a moving collecting surface travelling at a linear speed considerably less than that of the strands whereby the strands deposit thereon in overlapping swirl patterns, simultaneously raining staple glass fibers from above onto the collecting surface whereby the staple glass fibers interfelt with each other and the strands to form a highly porous glass fiber fabric having high strength in all planar directions, applying a bituminous material in the form of a hot melt onto the surface of the fabric in sufficient quantity to fill the interstices, advancing the fabric with the molten bituminous material thereon through refrigerated squeeze rolls which force the bituminous material into the press of the fabric while cooling same to non-flowable condition, and simultaneously advancing continuous strands of glass fibers in closely spaced apart parallel relation to the area adjacent the faces of the fabric before it passes to between the squeeze rolls whereby the strands become embedded in the bituminous material forming the coatings on the outer walls of the fabric.

References Cited in the file of this patent

UNITED STATES PATENTS

| | | |
|---|---|---|
| 1,756,989 | Overbury | May 6, 1930 |
| 2,184,316 | Plummer | Dec. 26, 1939 |
| 2,206,059 | Slayter | July 2, 1940 |
| 2,252,157 | Bergin et al. | Aug. 12, 1941 |
| 2,343,601 | Weimann | Mar. 7, 1944 |
| 2,439,689 | Hyde | Apr. 13, 1948 |
| 2,455,454 | Walter | Dec. 7, 1948 |
| 2,457,784 | Slayter | Dec. 28, 1948 |
| 2,512,371 | O'Reilly | June 20, 1950 |
| 2,517,753 | Ximenez et al. | Aug. 8, 1950 |
| 2,523,759 | Grant | Sept. 26, 1950 |
| 2,528,091 | Slayter | Oct. 31, 1950 |
| 2,550,465 | Gorski | Apr. 24, 1951 |
| 2,552,124 | Tallman | May 8, 1951 |
| 2,555,401 | Fasold | June 5, 1951 |
| 2,595,127 | Coffey | Apr. 29, 1952 |
| 2,610,893 | Collins et al. | Sept. 16, 1952 |
| 2,662,044 | Morrison et al. | Dec. 8, 1953 |
| 2,671,745 | Slayter | Mar. 9, 1954 |
| 2,695,257 | Castellani | Nov. 23, 1954 |

FOREIGN PATENTS

| | | |
|---|---|---|
| 6,693/32 | Australia | Mar. 9, 1933 |